C. H. NORTON.

TRUCK FOR WASTE MATERIAL.

APPLICATION FILED JULY 22, 1919.

Reissued May 16, 1922.

15,356.

2 SHEETS—SHEET 1.

Inventor
Charles H. Norton
By Clayton L. Jenks
Attorney

C. H. NORTON.
TRUCK FOR WASTE MATERIAL.
APPLICATION FILED JULY 22, 1919.
Reissued May 16, 1922.
15,356.
2 SHEETS—SHEET 2.
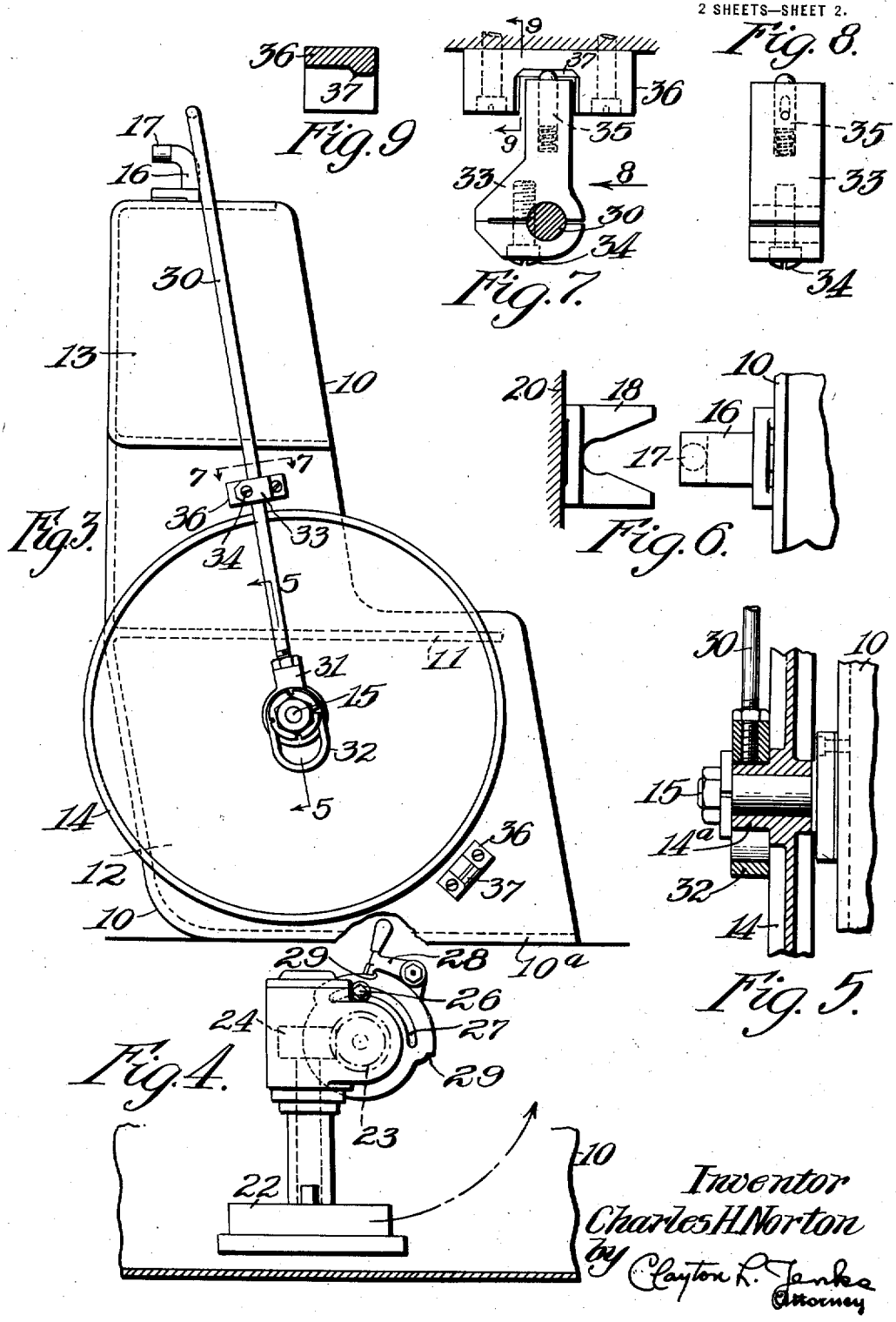

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

TRUCK FOR WASTE MATERIAL.

15,356. Specification of Reissued Letters Patent. Reissued May 16, 1922.

Original No. 1,234,376, dated July 24, 1917, Serial No. 118,144, filed September 1, 1916. Application for reissue filed July 22, 1919. Serial No. 312,578.

*To all whom it may concern:*

Be it known that I, CHARLES H. NORTON, a citizen of the United States of America, residing at Worcester, in the county of Worcester and State of Massachusetts, have invented certain new and useful Improvements in Trucks for Waste Material, of which the following is a full, clear, and exact specification.

This invention relates to a truck for waste material, particularly designed for use in connection with grinding machines and other similar machine tools.

When such machines are used for heavy duty it is customary to flood the grinding wheel or other tool with a cutting compound, maintained in rapid circulation by means of a rotary pump. As the liquid and waste material leave the tool it is conveyed to a settling tank in which a large proportion of the waste material is retained while the partially cleared liquid is returned by the pump to the cutting tool.

It has been customary to form the settling tank and pumping chamber as integral parts of the machine, but objections have been found to this method of construction. Under modern conditions of operation, the waste material accumulates very rapidly in the settling tank and it is necessary to frequently empty and clean both the tank and the pump chamber. This operation requires a considerable amount of time during which the machine is necessarily inoperative.

It is the object of my invention to improve such conditions by providing a truck for the waste material which may be readily removed for dumping and cleaning. In its preferred form a partition separates the truck or tank into settling and pumping compartments. In the use of this truck it is assumed that a plurality of trucks will be provided so that one truck may be withdrawn and another substituted as soon as the settling tank is filled to a point which necessitates removal of the waste material.

In connection with my improved truck I also provide a pump which may be readily raised to permit withdrawal of the truck without disconnecting the pump from the machine to which it is attached.

Further features of my invention relate to the form of the tank, to means for positioning the tank relative to the pump and the machine to which the pump is attached, and to the handle provided for moving the truck. Other features of my invention relate to certain arrangements and combinations of parts hereinafter described and more particularly pointed out in the appended claims.

A preferred form of my invention is shown in the drawings, in which—

Fig. 3 is a side elevation of the truck removed from the grinding machine and in dumping or cleaning position;

Fig. 4 is an end elevation of the pump showing the manner of its removal from operative position;

Fig. 5 is a detail sectional view of the connection between the handle and the truck, taken along the line 5—5 in Fig. 3;

Fig. 6 is an enlarged detail view of the means for positioning the truck relative to the machine;

Fig. 7 is an enlarged sectional view taken along the line 7—7 of Fig. 3 and showing the means for locking the handle in position on the truck;

Fig. 8 is a side elevation of the locking member which is secured to the handle, and Fig. 9 is a sectional view of the locking plate which is secured to the tank, taken along the line 9—9 of Fig. 7.

Figure 1:
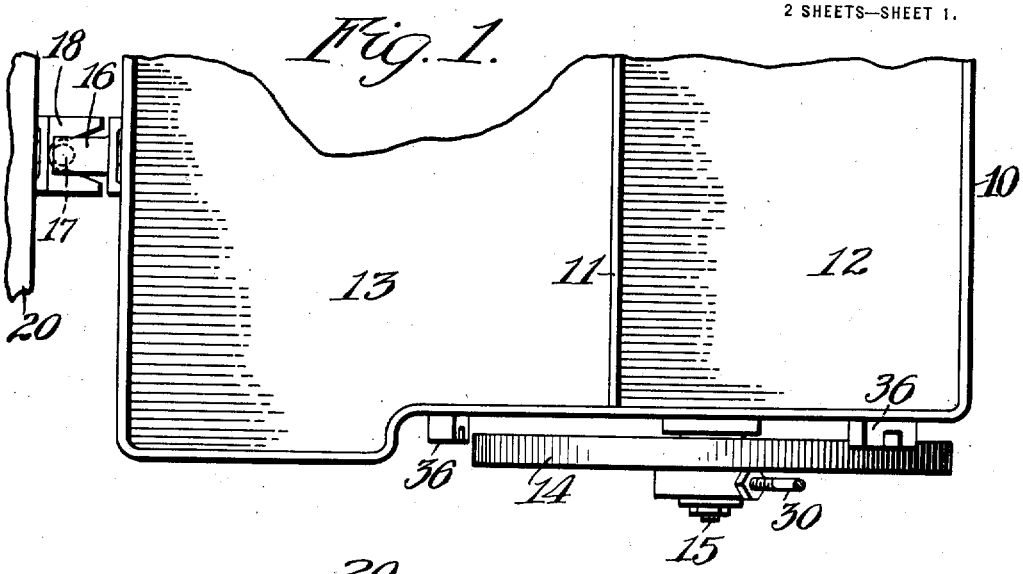
Figure 1 is a partial plan view of a truck embodying my improvements.
Figure 2:
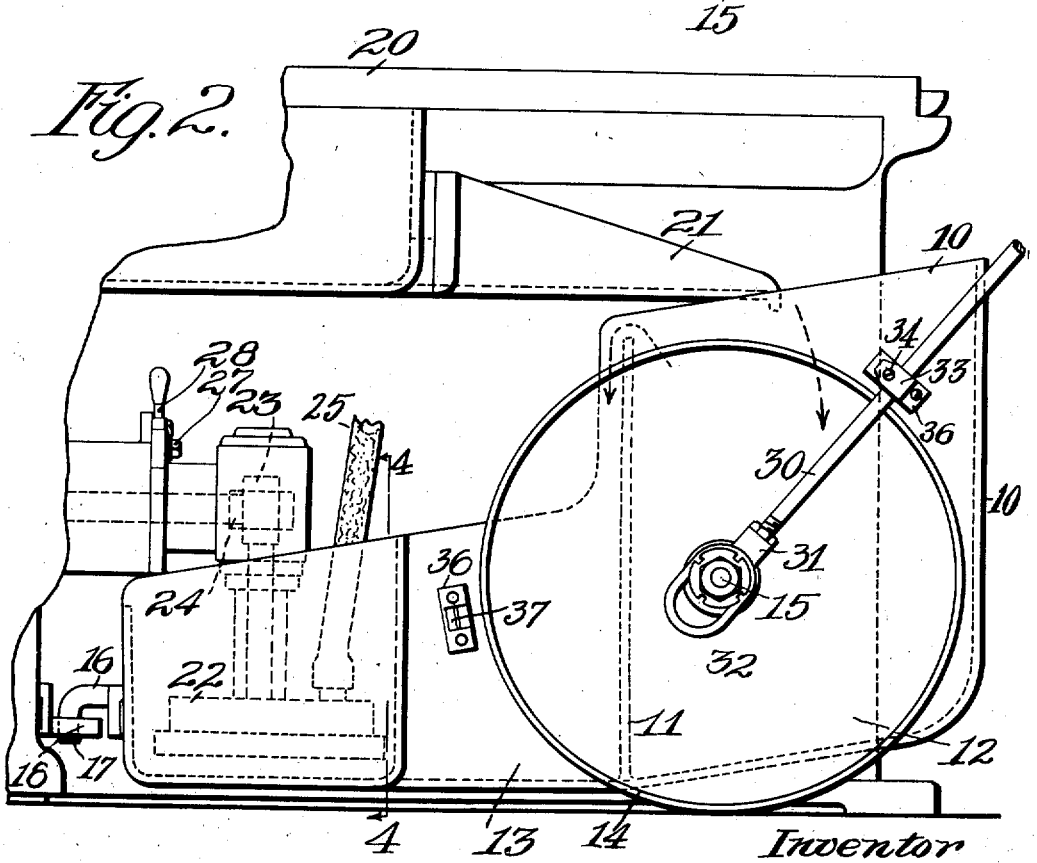
Fig. 2 is a side elevation of the truck shown in Fig. 1 and also shows parts of a grinding machine with which the truck may be used.

Referring to Figs. 1, 2 and 3, my improved truck comprises a tank or casing 10 preferably separated by a partition 11 into a settling chamber 12 and a pump chamber 13. The partition 11 extends to a point slightly below the top of the settling chamber 12 and thus permits over-flow of the liquid from the chamber 12 to the chamber 13. A pair of wheels 14 are rotatable upon studs 15 (Fig. 5) secured to the sides of the tank or casing 10. The wheels 14 support the truck near the outer end thereof, but the load is so distributed that it is largely balanced about the center of the studs 15.

At its inner end the truck is provided with a projection 16 having a downwardly extending cylindrical portion 17. A bracket 18 is secured in any convenient manner to the frame of the grinding or other machine with which the truck is to be used. The bracket 18 has a outwardly projecting flange shaped as shown in Fig. 6 to provide a flaring opening for guiding the cylindrical portion 17 of the projection 16 to its desired position. In this position the shoulders of the projection 16 above the cylindrical portion 17 rest upon the bracket 18 and thus support the rear portion of the truck, while the portion 17 prevents accidental sidewise displacement thereof.

In Fig. 2 I have indicated a grinding machine 20 having an extension 21 serving as a part of the grinding fluid conduit from which the cutting compound and waste material flows into the settling tank 12. I have also indicated a rotary pump 22 having spiral gears 23 and 24 or other suitable driving connections from the grinding machine, and I have shown a pipe or conduit 25 which conveys the cutting compound back to the grinding wheel. The pump 22 is mounted to swing about the axis of the gear 23 so that it can be turned into a generally horizontal position in which it clears the rear wall of the truck. A bolt 26 is threaded into a fixed part of the grinding machine and passes through a curved slot 27 so that the pump may be secured in either position by tightening the bolt. In order to increase the speed with which the pump may be manipulated, I prefer to employ a latch 28 to secure it in either position. This latch is pivoted on a fixed part of the machine and constructed to engage one or the other of two notches 29 formed on the flange of the pump casing. After the pump is thus raised the truck may be conveniently removed by means of the U-shaped handle 30.

The ends of the handle 30 are provided with heads 31 formed with elongated loops 32 which are slidable longitudinally and angularly movable on the hubs 14ª of the wheels 14. Special provision is made for locking the handle to the truck in either one of two positions. Each side portion of the handle is provided with a locking member 33 clamped to the handle by a screw 34 and provided with a spring-pressed plunger 35. Cooperating locking plates 36 are secured to the sides of the tank 10, one pair of plates being provided for positioning the handle a shown in Fig. 2 and an additional pair of plates for positioning the handle as shown in Fig. 3. Each plate 36 is deeply notched to receive the member 33 and is provided with a raised rib 37, as shown in Fig. 9.

Assuming that the handle is to be shifted from the position shown in Fig. 2 to that shown in Fig. 3, the handle is raised and pulls the loops 32 along the hubs 14ª until the locking members 33 are moved out of the locking plates 36. The handle can then be swung to the desired position, after which it is pushed in until the locking members enter the notches or recesses between the raised side portions of the plates 36, and the plungers 35 pass across the ribs 37. The handle is thus held against sidewise movement by the plates 36, and the plungers 35 prevent accidental endwise movement.

When the truck is moved to its upright or dumping position it is raised from its wheels and rests on the end portion 10ª of the casing 10. The adjacent lower corner of the casing is rounded off so as to permit easy movement of the truck to the position of Fig. 3 and the dumping of the load is thus readily accomplished. While in this position the waste material in the settling tank can be readily removed and the entire device can be cleaned with little difficulty.

By the use of this truck the time lost during the removal of the waste material has been very largely reduced.

Having thus described my invention it will be evident that further changes and modifications can be made therein by those skilled in the art without departing from the spirit and scope of the invention as set forth in the claims. I do not wish therefore to be otherwise limited to the details herein disclosed but what I claim is:—

1. In a grinding machine, the combination of a movable tank, means including wheels for supporting the tank and permitting ready removal and cleaning thereof, a pump for circulating liquid from the tank to the machine, said pump having a conduit opening into said tank at a point adjacent to the bottom thereof and driving and supporting means for the pump permitting the latter to be moved from an operative position without breaking the driving connections, whereby the tank may be removed for dumping the sediment therefrom.

2. In a grinding machine, the combination with a movable tank, of a pump pivotally supported on the machine for returning liquid from the tank to the machine, means to drive the pump, and securing means for said pump permitting it to be swung upward from its normal position prior to the removal of said tank.

3. In a grinding machine, the combination with a movable tank, of a pump for returning liquid from the tank to the machine, and an adjustable connection between said machine and pump permitting said pump to be raised from operative position and effective to hold said pump in either operative or inoperative position.

4. In a grinding machine, a driven shaft, a pump suspended from and driven by the shaft, a tank, wheels thereon permitting the tank to be readily moved and located adjacent the machine with the pump inside the tank and means effective to hold the pump either in inoperative position with relation to the tank or in position for circulating fluid to the grinding machine.

5. The combination with a grinding machine, of a truck for machine waste, said truck having a compartment adapted to receive liquid and waste material from the machine and having a second compartment into which said liquid overflows, and said machine having a pump adapted to re-convey said liquid from said second compartment to the working point of said machine, said pump comprising a driving shaft rotatable in fixed bearings, a head mounted for angular adjustment about the axis of said shaft, means to secure said head in adjusted position, and a rotary driven pumping member mounted in said head, angular movement of said head permitting the pumping member to be swung into and out of said second compartment, thereby permitting removal of a loaded truck.

6. In combination with a grinding machine, a movable truck comprising a casing having a settling tank and a pump chamber therein for containing liquid and waste material, means comprising wheels supporting said truck and permitting removal thereof from adjacent the machine, and cooperating means on the machine and truck to locate the truck accurately in operative position for pumping the liquid therefrom and hold it from accidental displacement.

7. In combination with a grinding machine having movable conduits, a pump and a discharge spout projecting over a clear space for circulating fluid to the grinding wheel, a freely removable truck having a chamber therein to hold said fluid, wheels supporting the truck near one end which are constructed and arranged to permit moving the truck and tilting it for dumping its contents and means to support the opposite end of the truck and locate it in operative position beneath the discharge spout.

8. In combination with a grinding machine having conduits for circulating a fluid to a grinding wheel, a fixed guiding member thereon, a truck for waste material comprising a casing, wheels supporting said casing near one end thereof, and a projection on the opposite end of said truck adapted for engagement with the fixed guiding member on the machine, said projection and member cooperating to position said truck and to support the rear end thereof.

9. A truck for waste material comprising a tank casing, a partition within said casing over which liquid can flow from one compartment to a second compartment, and wheels supporting said truck in one position, said casing having an end portion upon which said truck rests when in dumping position.

10. A truck for waste material comprising a casing, and wheels upon which said casing is supported in one position, said casing having an end portion constituting its base during cleaning operations, and said end portion being curved adjacent the circumference of said wheels, whereby the support of said truck may be readily changed.

11. A truck for waste material comprising a tank casing, wheels for said casing, a handle, means to hold said handle in convenient position to move said truck, and means to hold said handle in position to dump the waste material.

12. A truck for waste material comprising a casing, wheels supporting said casing, a handle on said casing, and means to secure said handle to said truck in either one of two positions, said means including a locking member having a spring-pressed plunger and a cooperating locking plate by which the handle is yieldingly held in either position.

13. A truck for waste material comprising a tank casing, wheels for said casing, a handle, means to hold said handle in convenient position to move said truck, and means to hold said handle in position to dump the waste material, said means comprising loops on said handle longitudinally slidable and angularly movable about the axis of the wheels, locking members on said handle, and separated locking plates on said casing effective to hold said handle in either one of two positions.

Signed at Worcester, Massachusetts, this 21st day of July, 1919.

CHARLES H. NORTON.

Certificate of Correction.

It is hereby certified that the assignee in Reissue Letters Patent No. 15,356, granted May 16, 1922, upon the application of Charles H. Norton, of Worcester, Massachusetts, for an improvement in "Trucks for Waste Material," was erroneously described and specified as "Norton Grinding Company, of Worcester, Massachusetts, a Corporation of Massachusetts," whereas said Letters Patent should have been described and specified as *Norton Company, of Worcester, Massachusetts a Corporation of Massachusetts*, as shown by the records of assignments in this office; and that the said Letters Patent should be read with this correction therein that the same may conform to the record of the case in the Patent Office.

Signed and sealed this 20th day of June, A. D., 1922.

[SEAL.]

KARL FENNING,

*Acting Commissioner of Patents.*